United States Patent
Shih et al.

(10) Patent No.: US 8,244,052 B2
(45) Date of Patent: Aug. 14, 2012

(54) VIDEO CODING METHOD USING IMAGE DATA SKIPPING

(75) Inventors: Yen-Chi Shih, Nantou (TW); Tian-Sheuan Chang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1381 days.

(21) Appl. No.: 11/895,877

(22) Filed: Aug. 28, 2007

(65) Prior Publication Data
US 2008/0112484 A1 May 15, 2008

(51) Int. Cl.
*G06K 9/36* (2006.01)
(52) U.S. Cl. ........................................ 382/239
(58) Field of Classification Search ............ 382/239
See application file for complete search history.

(56) References Cited

U.S. PATENT DOCUMENTS

| | | | |
|---|---|---|---|
| 6,192,148 B1 | 2/2001 | Lin | |
| 6,385,345 B1 | 5/2002 | Ribas-Corbera et al. | |
| 6,396,956 B1 | 5/2002 | Ribas-Corbera et al. | |
| 6,560,370 B2 | 5/2003 | Ribas-Corbera et al. | |
| 6,804,294 B1 | 10/2004 | Hartung et al. | |
| 6,970,506 B2 | 11/2005 | Kim et al. | |
| 6,993,078 B2 | 1/2006 | Hall et al. | |
| 7,092,443 B2 | 8/2006 | Francois et al. | |
| 2001/0046263 A1 | 11/2001 | Yamada et al. | |
| 2006/0164543 A1* | 7/2006 | Richardson et al. | 348/390.1 |

FOREIGN PATENT DOCUMENTS

FR 2824988 11/2002

* cited by examiner

*Primary Examiner* — Christopher Brown
(74) *Attorney, Agent, or Firm* — Bucknam and Archer

(57) ABSTRACT

The present invention discloses the video coding method using image data skipping. Said method detects whether the encoded macro-block has to be skipped and terminated by a likelihood ratio test prior to mode decision. Therefore, the computation burden such as motion estimating and compensating can be properly eliminated. In one embodiment, the skipping likelihood ratio is composed of the encoded block and its predictions associated with the skipping displacement. While the decision threshold adapts according to the mode decision and detection statistics, the false detection and rate-distortion are substantially preserved.

8 Claims, 4 Drawing Sheets

VIDEO CODING METHOD USING IMAGE DATA SKIPPING

FIELD OF THE INVENTION

The present invention relates to a method for video coding and more in particular to a video coding method that is capable of detecting image data to skip.

BACKGROUND OF THE INVENTION AND PRIOR ART

An encoding detection beforehand is able to reduce the operational power losses of a practical circuitry. Prior art in this field can be categorized into two types, namely the type being applied to transform domain/quantization encoding, and the method for detecting image data to be skipped.

1. Application to transform domain/quantization encoding: detect prediction errors in advance to see if they are all zero coefficients so as to reduce the computation burden of transform coding. If the reconstruction coefficients are zero blocks, then the transform coefficients are also zero blocks, and vice versa. Under the condition of portable application, there is a great probability that the reconstruction coefficients are zero, therefore unnecessary coding computations can be avoided by using the transformation formula to derive the detection conditions for all-zero transformation coefficients. However, since transform coding is not the major source of computations, the said detection is not efficient enough to substantially reduce the computation burden of coding device.

2. Method for detecting image data to be skipped: In U.S. Pat. No. 6,396,956, there is disclosed a video coding method using image data skipping. In this method, degree of variation of an image is calculated at first, and then this variation is used to compute a variation threshold. If a sorted variation is smaller than the threshold, then an image is skipped from the reconstruction frame for the encoding block corresponding to this variation. The drawback of this method lies in that some additional calculation is needed in order to compute the block variations and some additional memory has to be allocated in order to access the block variations and arrange the variations in a decreasing or increasing order. In compared with the present invention, because the prior art technique is based on image coding, not only the detection computation is complicated, but a rough modeling may also reduce the quality of the coding.

Moreover, in U.S. Pat. No. 6,560,370, there is disclosed another video coding method using image data skipping. In this method, degree of variation of an image is calculated at first, and then this variation is used to compute a variation threshold. However, in this method, during the detection process, some additional memory has to be allocated in order to temporarily store the block variations, and then a threshold value is computed after the variations are suitably sorted; finally the blocks that are not selected as image data to be skipped in the frame are encoded. In compared with the present invention, in the method proposed in U.S. Pat. No. 6,560,370, not only the coding process is much more complicated, but the computation burden for detecting the image data to skip is also increased.

Additionally, in U.S. Pat. No. 6,192,148, there is disclosed yet another video coding method using image data skipping. In this method, sums of the absolute values of the prediction residuals between estimated motion and luminance, chrominance are compared in order to test the feasibility of block skipping. However, prior motion estimation is needed in this method, therefore in compared with the present invention the amount of operation that can be reduced in the said prior art technique is very limited.

Furthermore, in U.S. Pat. No. 6,993,078, there is disclosed yet another video coding method using image data skipping. This method is similar to the invention described in the aforementioned U.S. Pat. No. 6,192,148, where the computation of motion estimation is needed in both cases and then the feasibility of the block skipping is examined by using the sums of the absolute values of the prediction residuals between motion vectors and chrominance, luminance together with the maximum predicted absolute differences of chrominance, luminance. In compared with the present invention, the capability of the block skipping detection is restricted in the said method.

Furthermore, in U.S. Publication No. 2006/0164543 published on Jul. 27, 2006, there is disclosed another video loading method using image data skipping. The Zero prediction displacement and constant threshold of this method is limited the detecting function of the block to be skipped.

In order to improve the drawbacks in the aforementioned prior art, the present invention provide herewith a video coding method using image data skipping based on likelihood ratio testing. A likelihood ratio of block coding is computed for each partitioned data corresponding to the prediction displacements and then the likelihood ratio is used to dynamically adjust decision intervals so as to determine whether the block encoding has to be terminated; therefore the detection capability can be efficiently improved, and the computation burden, memory access and power consumption of a encoding device can be reduced so that the drawbacks existing in the prior art can be substantially improved.

SUMMARY OF THE INVENTION

The main objective of the present invention is to provide a video coding method using image data skipping, which is a prediction coding based on block examination. A likelihood ratio testing with low complexity is able to provide a decision on real-time prediction of block skipping. Block encoding likelihood ratios and dynamic decision thresholds are used to determine whether the encoded blocks are predicted blocks to be skipped, while prior mode detection can be used to adequately remove the computation burden such as motion estimation and motion compensation, etc., and therefore the power consumption of encoding devices can be substantially reduced.

Another objective of the present invention is to provide a video coding method using image data skipping, in which the prediction and detection statistics is used to dynamically adjust; and the decision threshold is also adaptively adjusted in accordance with the encoding status of the presently encoded sequence, therefore the false probability can be maintained during the examination process which then, in turn, is able to maintain the encoding quality of coding devices.

A further objective of the present invention is to provide a video coding method using image data skipping, in which block skipping displacement is predicted by using the displacement of adjacent encoded blocks; therefore it is able to reduce reconstruction distortion of prior art technique, which is predicted by zero, and then the operational power consumption of practical circuits can be reduced during an encoding process.

Another further objective of the present invention is to provide a real-time and simple detecting method for block likelihood ratios, which, under both cost and practicability considerations, is able to achieve the requirement of low power consumption. In the following, the problems that are going to be solved in the present invention and the technical means being used to solve the problems are detailed as well as a thorough explanation of the effectiveness of the present invention in compared with prior art techniques.

In order to reduce the operational power consumption of a practical circuit during an encoding process and in the mean time also maintain the encoding quality, there is disclosed herewith a video coding method using image data skipping. Video coding devices using this technique are able to maintain the encoding rate-distortion performance and in the mean time adequately remove the redundant operation of the coding devices in order to reduce the power loss.

The encoding quality can be efficiently increased by utilizing a suitable prediction mode. For some advanced coding devices, the decision of the prediction mode is computed by using the following equation:

$$\text{MODE}^* = \arg\min_{\text{MODE}} J(s, c, \text{MODE} | \lambda), \quad (0.1)$$

where MODE* is the optimal prediction mode for the encoded block, J is the encoding cost corresponding to the prediction mode, which can be defined as follows:

$$J(s,c,\text{MODE}|\lambda) = SSD(s,c,\text{MODE}) + \lambda \cdot R(s,c,\text{MODE}), \quad (0.2)$$

where s represents an encoding macro-block, c is a reconstruction of coding, the parameter $\lambda$ is a Lagrange multiplier and R is the number of encoding bits needed while encoding by the present prediction mode MODE; and the reconstruction distortion SSD is the sum of squared difference (SSD) of encoding the macro-block s and reconstructing macro-block c, which can be represented by the following equation:

$$SSD(s,c,\text{MODE}) = \|S_Y - C_{Y,\text{MODE}}\|^2 + \|S_U - C_{U,\text{MODE}}\|^2 + \|S_V - C_{V,\text{MODE}}\|^2, \quad (0.3)$$

where $\|\cdot\|$ is a generalized norm computation: If A is defined as an N×M dimensional vector over the field of real numbers, then $\|A\|$ satisfies the relationship $\|A\| = \sqrt{A^T A}$; furthermore, the subscripts Y and U, V represent respectively the luminance and chrominance data of a digital image.

For portable video device applications, such as video phones, teleconferencing, etc., due to the limitation on the channel capacity, block skipping encoding is generally used since the predicted displacement of block skipping can be computed by using only the displacements of adjacent encoded blocks without the need of motion estimation; therefore the prediction data can be retrieved in advance by the encoding device and can then be used to compute Equation (0.2). Therefore the present invention provides a predictive detection method in connection with image data skipping. The computation burden of a coding device can be reduced effectively by using the method proposed in the present invention, and then the power loss of a practical circuit can be decreased.

It can be seen from Equations (0.1) and (0.2) that, when the encoding distortion of the block to be skipped (SKIP) is not larger than the distortion of other modes (CODE), the corresponding block is predicted to be an optimal coding mode as shown in the following equation:

$$SSD(s,p,\text{SKIP}) \leq SSD(s,c,\text{CODE}), \quad (0.4)$$

where p denotes prediction data of block to be skipped. Moreover, Equation (0.3) can be further represented by the Equation (0.5):

$$SSD(s,c,\text{MODE}) = \|r_Y - r_Y^1\|^2 + \|r_U - r_U^1\|^2 + \|r_V - r_V^1\|^2, \quad (0.5)$$

where $r = s - c$ is the prediction residual, c is the reconstruction data of the predicted mode MODE corresponding to the encoded block, r' is a reconstruction of the prediction residual. It is noted that if the predicted mode is block skipping then $c = p$. Consider the case that if estimation motion of the prediction outside a 16×16 frame is equal to the predicted motion of the encoded block, and the reconstruction of the predicted residual is an all-zero block, then obviously block skipping is the optimal prediction mode. The previous statement is used as a detection condition both in U.S. Pat. Nos. 6,192,148 and 6,993,078; however, because this condition is overly restrictive and the computation of motion estimation is still needed, the detection ability of image data to be skipped is limited.

To have a further analysis, we define a zero block as the coefficients of the prediction residuals that are all zeros after transformation and quantization. Because the transformation process is energy-conservative, mean squared errors of the reconstructions of zero blocks and non-zero blocks have the following relationship:

$$E\{\|X - X^1\|^2 | T(X) = 0\} \leq E\{\|X - X^1\|^2 | T(X) \neq 0\} \quad (0.6)$$

where the vector X is a predicted residual in the time domain. Under this condition, if, after being transformed and quantized, the predicted residuals of the block both are zero blocks, then the MSE of the reconstructed block satisfies the following relationship:

$$E\{\|s - p\|^2 | T(r_n) = 0, \forall n\} \leq E\{\|s - c\|^2 | \text{CODE}\}. \quad (0.7)$$

Obviously, in this case the encoding cost satisfies the Equation (0.8):

$$E\{J(s,c,\text{SKIP}|\lambda; T(r_n) = 0, \forall n)\} \leq E\{J(s,c,\text{CODE}|\lambda)\} \quad (0.8)$$

Therefore, averagely speaking, if the prediction residual of block to be skipped is an all-zero block, then block skipping is an optimal prediction mode. However, because some additional computations such as transformation and quantization are needed in order to derive a zero block, therefore it is not suitable for prior detection of image data to be skipped. Although the aforementioned problem can be determined by using the zero-block discrimination equation so as to avoid transformation and quantization in the encoding process, indirect zero-block discrimination equation, however, may limit the necessity of the usage of image data skipping. In other words, the probability of block skipping detection may be reduced.

Therefore, in the present invention, there is provided a detection method for image data skipping with low cost, in which a direct likelihood ratio testing is used to increase the detection probability of block skipping. Likelihood ratio testing is performed by comparing a likelihood function $\Lambda(z)$ with a decision threshold $\eta$ as follows:

$$\Lambda(z) \underset{H_0}{\overset{H_1}{\gtrless}} \eta \quad (0.9)$$

where $H_1$ is a subject to be tested in the discrimination equation, $H_0$ is its alternative hypothesis, z is an observation, which is a combination of arbitrary statistics such as the minimum sum of absolute difference (SAD) of luminance motion estimation, number of the zero-coefficient blocks, etc. Generally, there is a consistency relationship existing in between the detection probability $P_D$ and the false detection probability $P_F$ as described in the Equation (0.10) and Equation (0.11):

$$P_D = Pr\{MODE=SKIP | MODE^*=SKIP\} \quad (0.10)$$

$$P_F = Pr\{MODE=SKIP \text{ and } MODE^* \neq SKIP\}. \quad (0.11)$$

Hence, if it is desirable to raise the detection probability, then the risk of false detection will also rise accordingly. Therefore, if it is desirable to maintain the encoding rate-distortion performance of a detection device, the probability of false detection is set equal to $\alpha$ and in the mean time maximize the probability of detection. The previous expression can be represented as follows:

$$\max P_D \text{ subject to } P_F = \alpha. \quad (0.12)$$

In order to resolve the detection error induced by a complicated probability-type modeling process, in the present invention a receiver operating characteristic (ROC) is analyzed to replace the modeling process that is difficult to implement, and the computation of Equation (0.12) is realized by the probability of detection and the probability of false detection corresponding to a certain likelihood ratio function. Based on the dependence of encoding blocks and skipping prediction on the mode decision and reconstruction errors, the encoding blocks and skipping detection are chosen in the present invention as the decision observation for detection, and the likelihood ratio function $\Lambda(z)$ is defined as follows:

$$\Lambda(s, p_{v_c}) = \max\left\{\sum_{ij} |(s_n - p_{v_c,n})_{ij}|\right\} \quad (0.13)$$

where s is the encoding block, the skipping prediction $p_{v_c}$ is the predicted block data corresponding to the predicted motion $v_c$, which is computed by adjacent encoded blocks and defined by coding standard, $n \in \{0, 1, \ldots, 256/N^2 - 1\}$ in which the integer N is the length and width of a partitioned sub-block. The decision interval of the likelihood ratio, probability of false detection and probability of detection are determined by the decision threshold $\eta$ of Equation (0.9). In order to adapt to different coding environment, the decision threshold is dynamically adjusted in accordance with the coding conditions.

Unlike the usual hypothesis test, if the detection of block skipping fails, the optimal prediction mode of the presently encoding block can be obtained by computing Equation (0.1). Therefore, the threshold can be adaptively adjusted by the detection status and the mode decision so as to maintain the probability of false detection and the encoding quality. For a detailed description about the adaptive adjustment of the threshold, it will be explained by a preferred embodiment of the present invention.

Additionally, the detection capability of a detecting device is predominantly decided by the predicted displacement of block to be skipped. A suitable prediction motion corresponds to smaller reconstruction distortion of block skipping, and the probability of image data skipping detection can also be increased while the unnecessary computation of the coding device can be reduced. Although a zero vector is used as a prediction motion in all the prior art techniques, nevertheless, in order to have a more suitable motion estimation, the present invention adopts the estimation motion of adjacent encoded blocks to compute the prediction motion and hence the coding computation can be effectively reduced.

For the purpose that the said and other objectives, characteristics, technical content, advantages and the achievable performance of the present invention can be clearly seen, and be easily and obviously understood, preferred embodiments of the present invention are subsequently described by referring to the enclosing drawings.

BRIEF DESCRIPTION OF THE DRAWINGS

Preferred embodiments of the present invention are hereafter described by referring to the enclosing drawings, wherein the same numbers indicate the same elements.

DETAILED DESCRIPTION OF THE PREFERRED EMBODIMENTS

Figure 1:
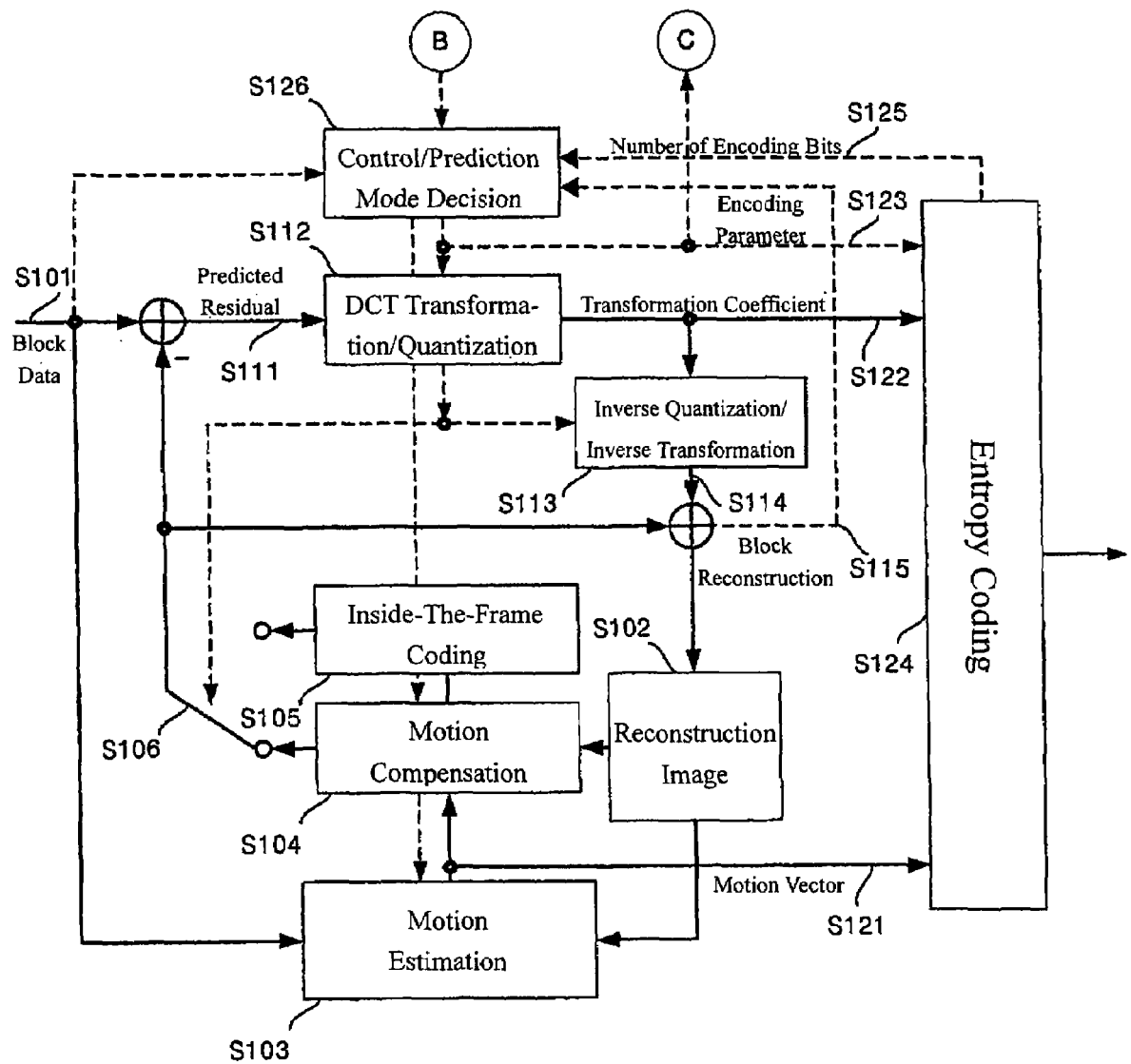
FIG. 1 shows a schematic diagram of a basic configuration for a conventional video encoder.

As shown in FIG. 1, a general video encoder can be divided into seven main basic functional blocks. Macro-block data is acquired in Step S101 and then perform motion estimation (ME) and image reconstruction in Step 103 and Step 102, respectively; and then perform motion compensation (MC) (outside-the-frame encoding) in Step S104 or perform an inside-the-frame encoding in Step S105. Outside-the-frame encoding or inside-the-frame encoding is determined by the control and mode decision step S126. In Step S111, prediction residuals of Step S101 and the predicted data step S106 are computed, and then the prediction residuals are processed by a discrete cosine transform (DCT) and a quantization procedure of step S112 to obtain transformation coefficients S122 of the prediction residuals, in which the transformation coefficients then undergo a reverse computation in Step S113 to derive a reconstructed prediction residual S114 and the result is further added by S106 so as to reconstruct the encoded block S115. In the entropy coding S124, the number S125 of encoding bits of the predicted mode is computed by using the motion vector S121, transformation coefficient S122 and the encoding parameter S123, while the block reconstruction S115 utilizes Equation (0.2) in Step S126 to calculate the encoding cost. In Step S126, the encoding costs for all the allowable pre-diction modes are computed, and use Equation (0.1) to determine the optimal prediction method; moreover, the reconstructed block is stored into the reconstruction image S102 and then proceed to the encoding of the next macro-block.

Figure 2:
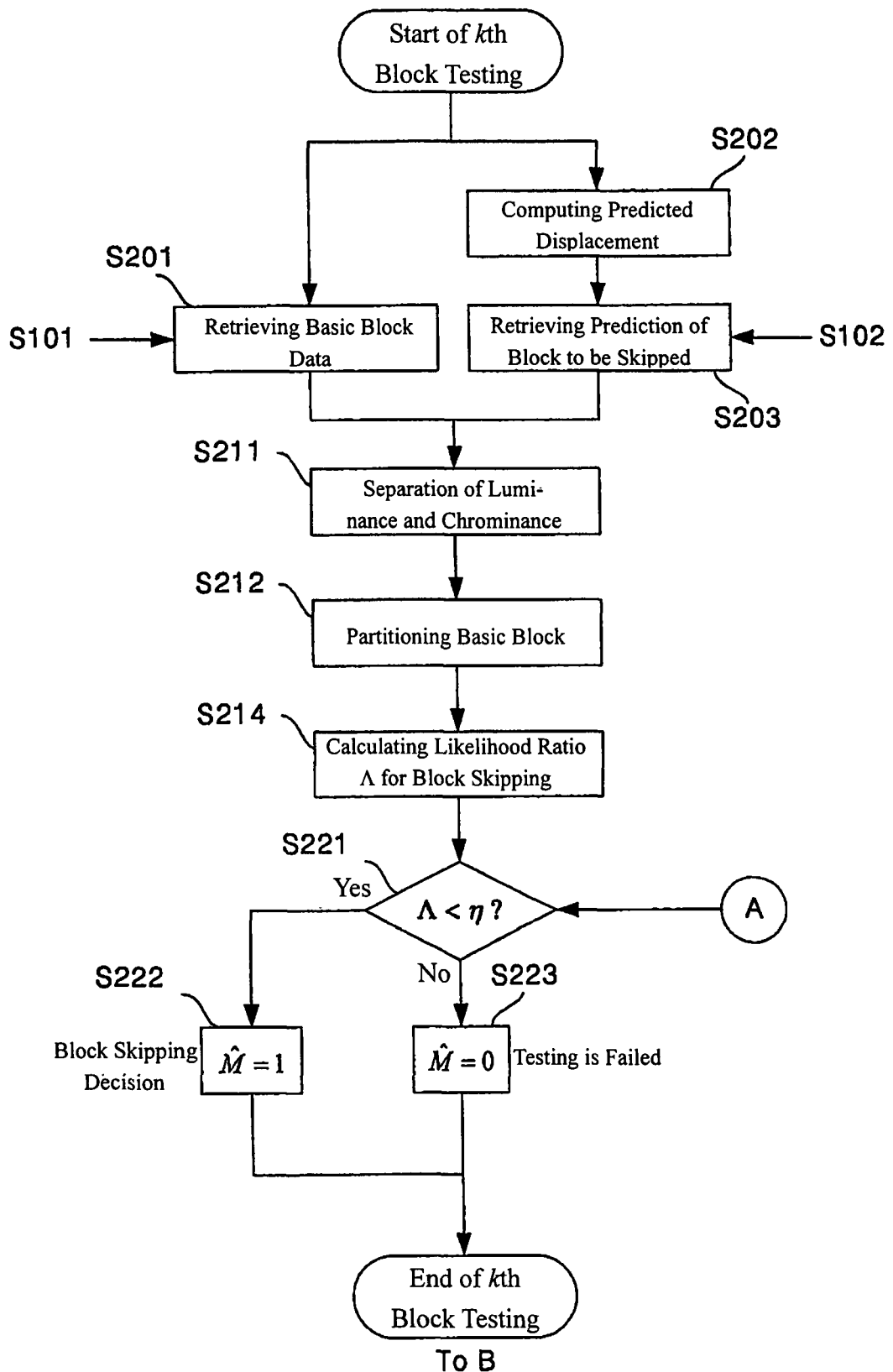
FIG. 2 shows a flowchart for an image data skipping method in the present invention.
Figure 3:
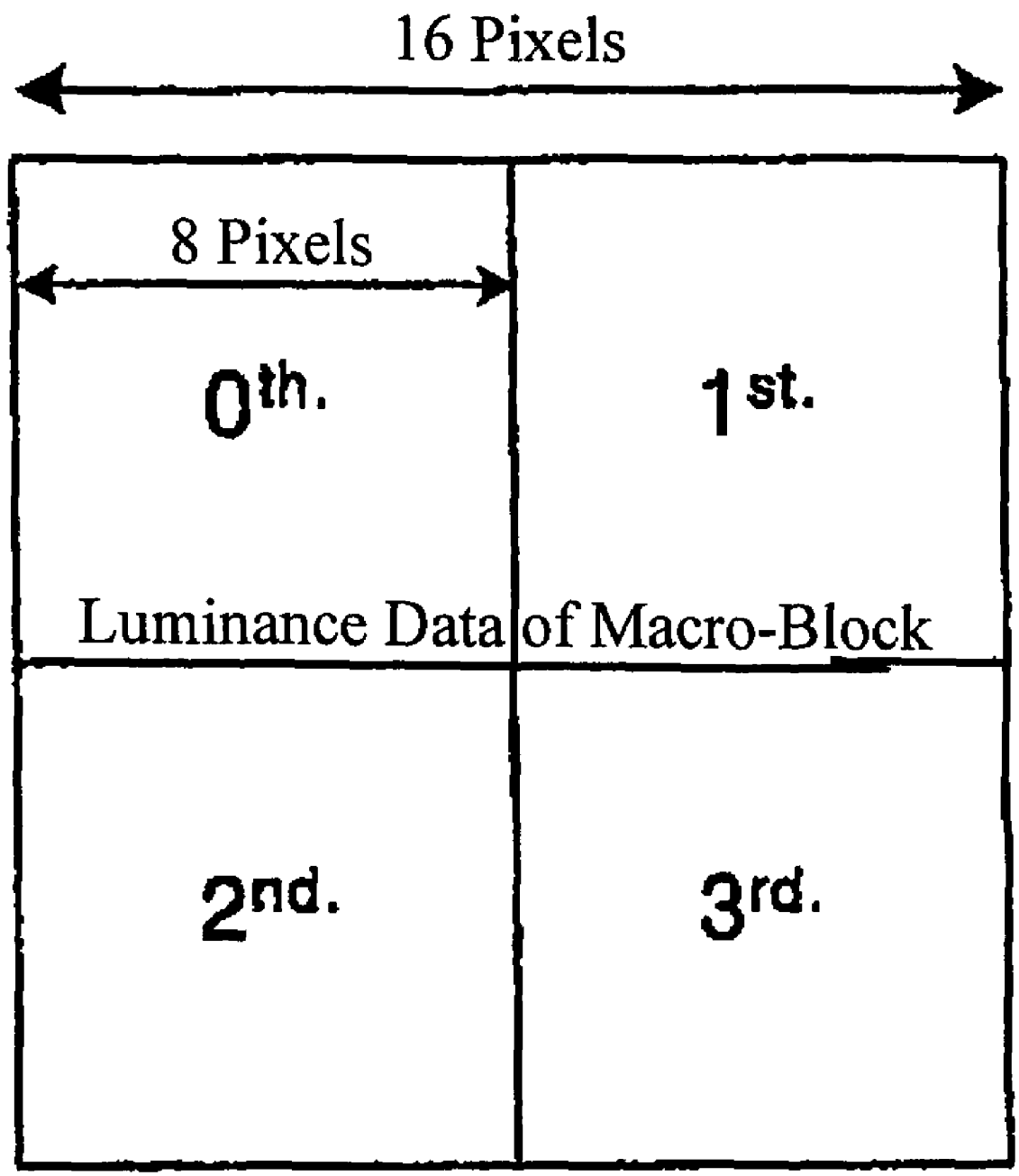
FIG. 3 shows an illustrated diagram for an arrangement of block partitions in a preferred embodiment of the present invention.

Detection of image data to be skipped can be used to decide the feasibility of the prediction mode prior to the calculation of encoding costs, and is therefore able to prevent a large amount of redundant computations in mode decision and also reduce the operational power consumption of a practical circuit during a coding process. FIG. 2 illustrates a flowchart for a data skipping coding method used in a video encoder in a preferred embodiment of the present invention. In Step S201, basic block data is retrieved from macro-block data to be encoded in Step S101, while in Step S202 the predicted skipping displacement of the coding block is computed. In Step S203, the prediction data corresponding to the predicted skipping displacement is retrieved from the reconstruction image S102. In Step S211, the block data obtained from Step S201 and Step S203 is divided into luminance blocks and chrominance blocks, where the definitions of luminance and chrominance are determined by coding standards. FIG. 3 shows a possible way to partition a block in a preferred embodiment. Based on the consideration that, after sub-sampling the chrominance data, luminance data will become the main source of reconstruction error, the chrominance data is discarded in the present embodiment and the luminance data is partitioned into uniformly overlapping sub-blocks each having 8×8 pixels. In Step S214, the likelihood ratio function of the block skipping is computed by using the encoded blocks and the partitioned sub-blocks of the prediction blocks, and then the possibility of block skipping is decided by using the following equation in Step S221:

$$\Lambda \underset{SKIP}{\overset{CODE}{\gtreqless}} \eta \qquad \text{Eq. 1}$$

If S221 is satisfied, then it is determined that the optimal prediction is block skipping (SKIP) and the result of block skipping detection in Step S222 is set to be $\hat{M}=1$; otherwise the block detection is failed (CODE) thus the predicted mode can not be identified immediately, and the result of block skipping detection in Step S223 is set to be $\hat{M}=0$ in this case, the detection is ended at this time, and the result of detection is transferred via B point to the control/prediction mode decision S126. If the result of detection is block skipping, then no computation for any mode decision is done in S126 and the macro-block is encoded by S124. If the detection of the block is failed, the coding device further executes coding operations including the decision of prediction mode, etc. In order to improve the limitation, existing in the prior art technique, on the block skipping prediction and implement methodological detection ratio, the predicted displacement adopts the computational medium of the adjacent encoded blocks as a prediction. If the block is located at the boundary of the image, a zero vector is served as a prediction. Hence the method is able to effectively reduce the prediction error of the predicted skipping displacement, and increase the possibility of the prediction of image data to be skipped.

$$\Lambda(s, p_{V_c}) = \max\left\{\sum_{j=0}^{7}\sum_{i=0}^{7}\left|(s_n - p_{V_c,n})_{ij}\right|, n = 0, 1, 2, 3\right\} \qquad \text{Eq. 2}$$

In Step S214, a likelihood ratio testing function $\Lambda$ of the block to be skipped is computed, where the likelihood ratio is determined by the encoding block s and a partitioned sub-block of the predicted block $p_{V_c}$. In order to consider the necessity and sufficiency of the computational complexity and the likelihood ratio testing, the present embodiment defines the formula (Eq. 2) to test the likelihood ratio function. This formula computes the maximal sum of the absolute value of the difference between the encoded sub-block $s_n$ and the predicted sub-block $p_{V_c,n}$ to serve as a likelihood ratio for the block skipping.

$$\eta = \kappa \cdot Q_{step} \qquad \text{Eq. 3}$$

$$Q_{step}(QP+6) = 2 \cdot Q_{step}(QP) \qquad \text{Eq. 4}$$

Figure 4:
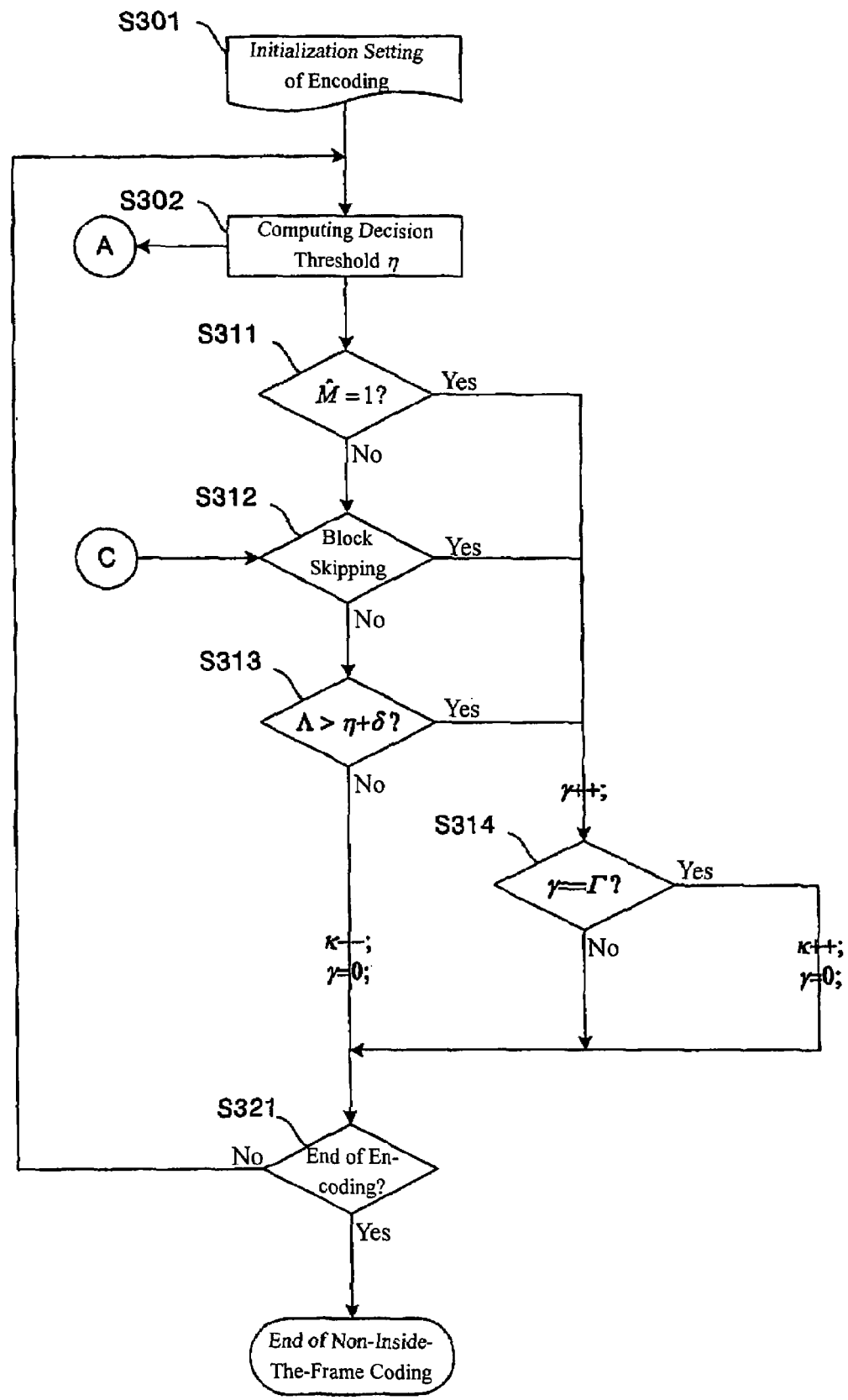
FIG. 4 shows a flowchart for the computation of a decision threshold used in a preferred embodiment of the present invention.

FIG. 4 shows a flowchart of a method for the computation of decision threshold in a preferred embodiment of the present invention. In Step S301, the initialization setting of non-inside-the-frame encoding is executed, including the protection interval $\delta$, testing upper bound $\Gamma$, number of testing $\gamma$ and the energy determination parameter $\kappa$, etc. Then, in Step S302, the decision threshold $\eta$ is calculated in accordance with the above equation (Eq. 3), where $Q_{step}$ is the quantization step, which is a function of the quantization parameter and the function has a relationship that, when the value of QP increases by 6, its value will be doubled as shown in Equation (Eq. 4). The relationship between the quantization parameter and the quantization step is shown in Table 1, where the range of the quantization parameter is from 0 to 5. If the detection of the macro-block encoding is failed, then, in Step S312, it is further determined whether the encoded block in Step S123 of FIG. 1 is a block to be skipped or not. If it is not a block to be skipped, then, in Step S313, while the testing likelihood ratio $\Lambda$ that are presently encoded is compared with the sum of the present decision threshold $\eta$ and the protection interval $\delta$ to check if the testing likelihood ratio $\Lambda$ is larger, the likelihood ratio is computed in Step S214 of FIG. 2 and the decision threshold is dynamically adjusted in according to the characteristic of the encoded image. If the result of the comparison is false, which indicates the decision threshold is too optimistic, then decrease the dynamic decision parameter and reset the number of tests; otherwise increase the number of tests that have already been done and further compare the number of tests via Step S314 to see if it has reached its upper limit. If the result is true, which indicates the decision threshold is too pessimistic, then the dynamic decision parameter is increased and the number of tests is reset. Finally, in Step S321, it is determined whether the outside-the-frame coding is ended or not; if not, then repeats Step S302.

TABLE 1

| | Quantization Parameter QP | | | | | |
| --- | --- | --- | --- | --- | --- | --- |
| | 0 | 1 | 2 | 3 | 4 | 5 |
| Quantization Step $Q_{step}$ | 0.625 | 0.6875 | 0.8125 | 0.875 | 1 | 1.125 |

In the present invention, the possibility of image data skipping is directly examined by using a likelihood ratio testing, where no computation about the mode decision is needed in prior mode detection. In the detection device, it is decided whether the block encoding can be terminated earlier or not in accordance with the block skipping likelihood ratio and the decision threshold, in which the block skipping likelihood ratio is a function of the encoded block and its block skipping prediction and the decision threshold is computed by using the quantization parameter of the present coding. The adaptive decision threshold is more suitable for a general encoding environment and its process flow is dynamically adjusted in accordance with the encoding status, where the encoding status comprises the prediction mode and the result of testing. For a detection device for image block skipping based on a likelihood ratio testing, it is able to maintain the quality of encoding, effectively remove redundant operations such as motion estimate and motion compensation, etc., and reduce the power consumption of a coding device so as to achieve the objective of low power consumption in the field of portable applications. That is, the present invention utilizes the simplest way to fulfill the requirement of low power consumption in order to incorporate both the cost and practical competition potentials.

Although the present invention is disclosed in the preferred embodiments described above, the inventive idea should not be limited only to those. It will be understood by those skilled in the art that various other changes in the form and details may be made without departing from the spirit and scope of the present invention. It is to be understood that various changes may be made in adapting to different embodiments without departing from the broader concepts disclosed herein and comprehended by the claims that follow.

The invention claimed is:

1. A video coding method using a hardware encoder computer device, comprising the steps of:

retrieving an elementary block of data to be encoded;

calculating a predicted displacement of the encoded block by using displacements of adjacent encoded blocks and retrieving a predicted block of data corresponding to the predicted displacement;

partitioning the encoded block and the skipping predicted block into encoding partitioned sub-blocks and predicted partitioned sub-blocks, and calculating the detection likelihood ratio Λ by using those partitioned sub-blocks; and calculating the decision threshold η and in the meantime using the decision threshold $_\eta$ and the detection likelihood ratio Λ to determine whether the encoded block is an image data to be skipped; if yes, terminating the coding of the present block;

otherwise the detecting is failed, and enabling the hardware encoder computer device to move on to the next step to further execute a coding operation, wherein the decision threshold η is computed by using the following formula:

$$\eta = \kappa \cdot Q_{step}(QP),$$

where κ is a dynamic decision parameter, QP is a quantization parameter which is designated by the hardware encoder computer device, and $Q_{step}$ is a quantization step parameter which is a function of the quantization parameter.

2. A video coding method in accordance with claim 1, wherein the basic block of data that is going to be encoded is a macroblock having a size of 16×16 pixels.

3. A video coding method in accordance with claim 1, wherein the predicted displacement corresponds to a predicted location of the encoded block in a reconstruction image.

4. A video coding method in accordance with claim 1, wherein the data of the encoded block and the data of the predicted block is luminance data of an image block.

5. A video coding method in accordance with claim 1, wherein the partitioned sub-block is a non-overlapping block having a size of 8×8 pixels.

6. A video coding method in accordance with claim 1, wherein the detection likelihood ratio Λ is computed by using the following formula:

$$\Lambda(s, p_{V_c}) = \max\left\{\sum_{j=0}^{7}\sum_{i=0}^{7}\left|(s_n - p_{V_C,n})_{ij}\right|, n = 0, 1, 2, 3\right\},$$

where s represents a luminance sub-block of the encoded block, and is a luminance prediction sub-block corresponding to a predicted displacement $v_c$.

7. A video coding method in accordance with claim 1, wherein the dynamic decision parameter κ is dynamically adjusted according to an encoding status, where the encoding status comprises a testing result of an encoded block and an optimal prediction mode of the encoded block.

8. A video coding method in accordance with claim 1, wherein the determination of whether the encoded block is an image data to skip is performed by comparing the detection likelihood ratio Λ with the decision threshold η to see if Λ is smaller than η; if the detection likelihood ratio Λ is smaller than the decision threshold η, the encoded block is an image data to be skipped; otherwise the detecting is failed, the hardware encoder computer device further executes coding operations including a motion-compensated prediction, a motion compensation and a decision of prediction mode.

* * * * *